Mar. 13, 1923.
O. E. HUNT
1,448,691
HEADLIGHT FOR MOTOR VEHICLES
Filed Jan. 3, 1918
2 sheets-sheet 2
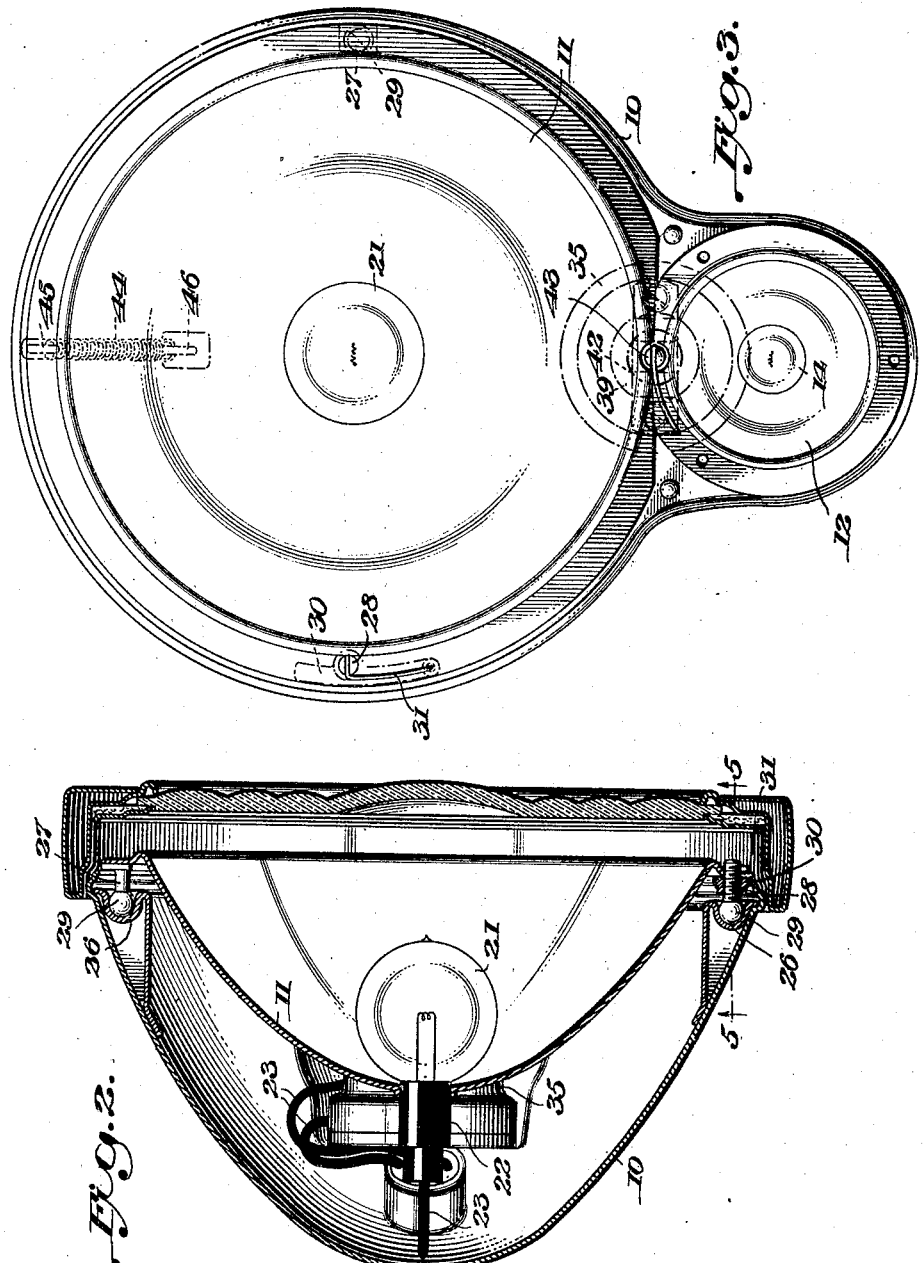

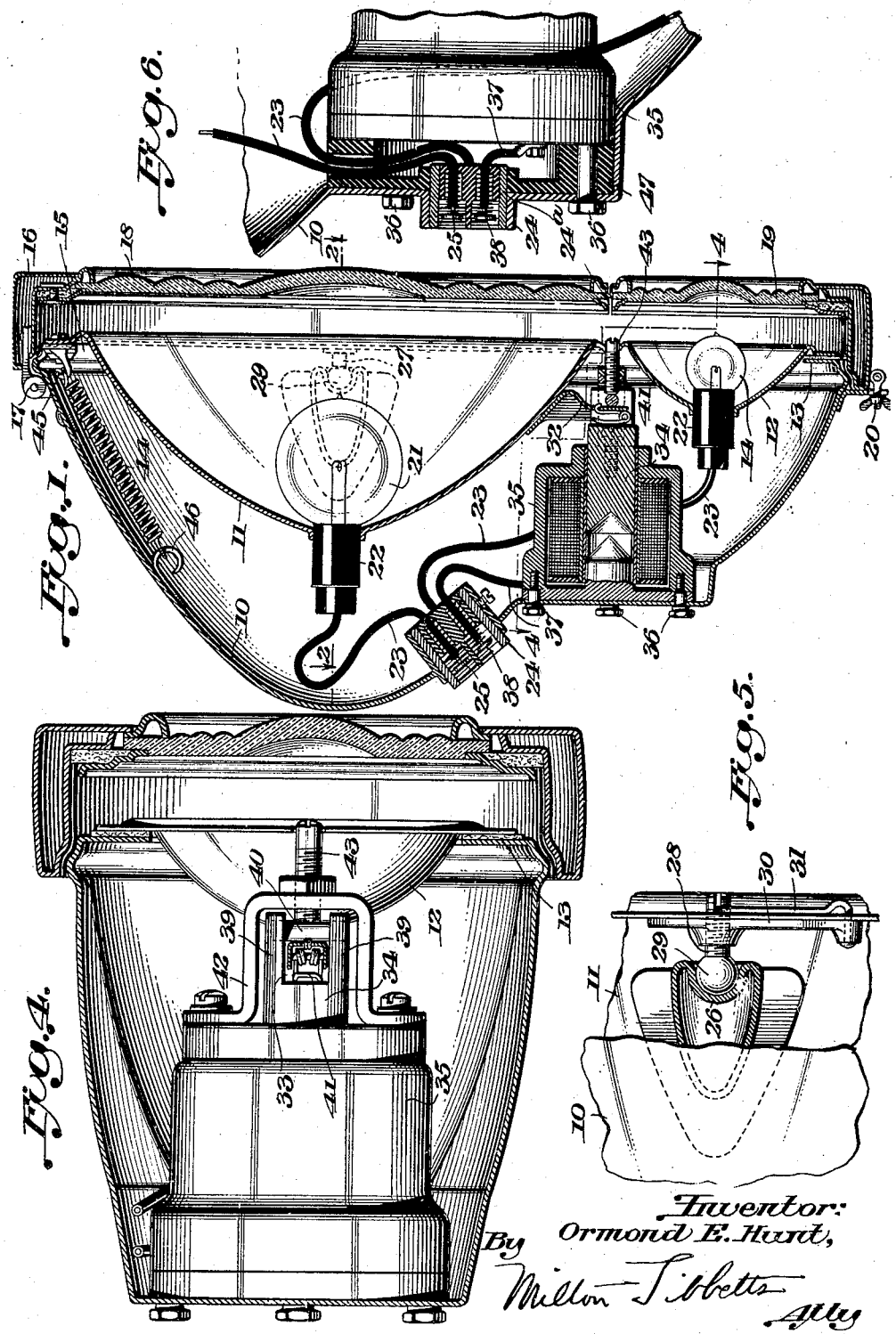

Patented Mar. 13, 1923.

1,448,691

UNITED STATES PATENT OFFICE.

ORMOND E. HUNT, OF DETROIT, MICHIGAN, ASSIGNOR TO PACKARD MOTOR CAR COMPANY, OF DETROIT, MICHIGAN, A CORPORATION OF MICHIGAN.

HEADLIGHT FOR MOTOR VEHICLES.

Application filed January 3, 1918. Serial No. 210,216.

*To all whom it may concern:*

Be it known that I, ORMOND E. HUNT, a citizen of the United States, and resident of Detroit, Wayne County, State of Michigan, have invented certain new and useful Improvements in Headlights for Motor Vehicles, of which the following is a specification.

This invention relates to motor vehicles and particularly to lamps therefor.

In attaching lamps or headlights to motor vehicles it is very important that they should be so placed thereon that the middle rays of light from the lamps shall project in a straight line forwardly or in some cases be directed downwardly slightly but to the same extent for both lamps where two lamps are used. It is not a possible manufacturing job to so make the lamps and their brackets that when fitted to the vehicle the lamps will be always in exactly the right place and heretofore the lamps have been adjusted on the vehicle by bending the lamp brackets or supports slightly to bring the lamps into the correct position. In some cases these lamp supports have been made so strong and rigid that this adjustment of the lamps after they are on the vehicle has become a difficult matter and it is one of the objects of the present invention to provide for an adjustment of the lamp reflector and the bulb carried thereby after the lamp has been positioned on the vehicle thus dispensing with the necessity of adjusting the entire lamp body.

Also, it is desirable in some cases to so mount the lamp or its reflector that the rays of light from the lamp may be temporarily directed downwardly onto the road more immediately in front of the vehicle to thereby prevent the glare from the lamps interfering with the vision of drivers of vehicles approaching from the opposite direction. It is one of the objects of the present invention to so support the lamp reflector that it may be tilted vertically by suitable manually operated means for the above purpose.

Another object of the invention is to simplify the mounting of the reflector in the lamp while at the same time providing for adjustment of the reflector both horizontally and vertically and for tilting the reflector, for the purposes suggested.

Other objects of the invention will appear from the following description taken in connection with the drawings which form a part of this specification, and in which:

Fig. 1 is a vertical sectional view through a lamp embodying the invention;

Fig. 2 is a horizontal section on the line 2—2 of Fig. 1;

Fig. 3 is a front view of the lamp body and reflectors with the front cover and lenses removed;

Fig. 4 is an enlarged horizontal section approximately on the line 4—4 of Fig. 1;

Fig. 5 is an enlarged detail sectional view substantially on the line 5—5 of Fig. 2; and Fig. 6 is an enlarged fragmentary section of a slightly modified form of combined solenoid and connector.

Referring to the drawings, 10 represents the body portion of a lamp made in accordance with this invention. As shown herein the lamp has two reflectors 11 and 12, one being mounted above and somewhat larger than the other so that several driving arrangements may be obtained from a single lamp. The small reflector 12 is rigidly and as shown non-adjustably secured to an inwardly extending flange 13 at the front of the lamp body, and this reflector is provided with a lamp bulb 14. This small reflector and lamp are used for ordinary city driving where a relatively small amount of illumination in front of the vehicle is required.

The front of the lamp body 10 is open as at 15 and a front cover 16 is pivotally or otherwise supported upon the lamp body as at 17 and provided with lenses 18 and 19 arranged in front of the reflectors 11 and 12 respectively when the cover is closed, as shown in Fig. 1. A fastening device 20 is provided to hold the front cover in closed position.

The reflector 11 is provided with a lamp bulb 21 of increased candle-power over the bulb 14, and both reflectors have lamp sockets 22 and connecting wires 23 which extend to a connector 24 suitably mounted in the rear part of the body 10. As shown the single wire system is used whereby the body of the lamp and its supports constitute the return circuit for the current and there is therefore a single terminal 25 only for each of said wires 23.

The reflector 11 is supported in the lamp body 10 so that it may be adjusted with its lamp bulb 21 relatively to the lamp body, after the lamp body has been secured to the vehicle. It is also mounted so that it may be tilted vertically and returned to the normal position to which it has been previously adjusted. For this purpose there are two socket pieces 26 mounted on opposite sides of the interior of the lamp body 10 near the front opening thereof, and parts or trunnions 27, 28 on opposite sides of the reflector are adapted to rest in these sockets. The sockets open towards the front and the trunnions 27, 28 are each formed with spherical heads 29 adapted to enter these sockets from the front. The trunnion 27 is shown as a rigid or an integral part of the reflector 11 and this trunnion therefore is non-adjustable, while the trunnion 28 is shown as threaded to a reinforcing piece 30 on the opposite side of the reflector 11. This trunnion or threaded device 28 therefore is capable of adjusting the reflector 11 horizontally on the spherical head 29 of the trunnion 27 so that the reflector may thus be adjusted to its normal and correct position after the lamp has been secured on the vehicle. A locking wire 31, shown in Figs. 2 and 3 and in detail in Fig. 5, fits in the notch of the trunnion 28 to hold it in adjusted position.

But two points of support for the reflector 11 have thus far been described. There is a third point of support at the lower part of the reflector. A bracket 32 is secured to the lower part of the reflector and extends into an opening 33 formed in the extended end of the core 34 of a solenoid 35. This solenoid is securely mounted within the lamp body as by bolts 36 and a wire 37 leads from it to a terminal 38 in the connector 24. It will be understood that by suitable electrical connections through the wire 37 the solenoid 35 may be energized to thereby draw the core 34 into it or towards the left in Figs. 1 and 4. Such electrical connections will be under the control of the operator of the vehicle.

The opening 33 above referred to is formed in the core 34 by two separated arms 39 and a bar 40 extending between them and the bracket 32 extends into this opening and is yieldingly held by means of a spring device 41 shown in Figs. 1 and 4. There is also a yoke 42 mounted on the end of the solenoid 35 and extending around the end of the core 34, and a threaded device or adjusting bolt 43 extends through the end of the yoke 42 and abuts against the bar 40 above described. A spring 44 at the top of the reflector 11 is connected to the latter by a hook 45 and to the body 10 of the lamp by a hook 46. This spring 44 retains the reflector in its proper normal position with the trunnions 27, 28 in their sockets and the bracket 32 in the opening 33 with the bar 40 against the bolt 43.

It will be understood that with the front cover 16 of the lamp removed or turned upwardly out of the way, the reflector 11 may be inserted in the lamp body through the front opening 15 by inserting the bracket 32 in the opening 33 and entering the trunnions 27, 28 in their sockets 26 and then connecting the spring 44 with the hook 45 so that the spring yieldingly retains the reflector in place. It will be understood further that after being so positioned the reflector may be adjusted horizontally by moving the device 28 until the rays from the reflector project correctly in that particular, and the threaded device or bolt 43 may then be adjusted to properly position the reflector vertically. Thus by screwing the device 43 inwardly against the bar 40 the core 34 will be moved and carry with it the bracket 32 which will consequently tilt the reflector 11 downwardly. A reverse movement of the bolt 43 will move the reflector upwardly slightly on its trunnions 27, 28. In this way the correct normal position of the reflector is obtained.

When this normal position of the reflector has been secured the rays of the lamp may be directed downwardly in front of the vehicle by energizing the solenoid 35 whereby the core 34 will be moved towards the left and the reflector 11 will be tilted on its trunnions. By de-energizing the solenoid the spring 44 will return the reflector to its normal position.

Thus it will be seen that by means of the three supports for the reflector, one of them being non-adjustable and two of them being adjustable in parallel and being separated from each other, the reflector may be adjusted both horizontally and vertically to its normally correct position, and then be tilted on its trunnions to a position for throwing the rays downwardly directly in front of the vehicle.

In Fig. 6 the solenoid 35 has a base 47 by which it is mounted in the lamp body and upon which a connector 24ᵃ is secured. This connector 24ᵃ extends through the lamp body as does the connector 24 and it has the same terminal as that connector. By the arrangement shown in Fig. 6 the connector and solenoid are combined.

Referring to Fig. 2, it will be obvious that the rigid or non-adjustable trunnion 27 may be replaced by an adjustable trunnion similar to the trunnion 28 if desired.

It will be understood further that my invention is not limited to the details of construction shown and other forms may be used without departing from the spirit or scope of the invention.

Having thus described my invention, what I claim and desire to secure by Letters Patent is:—

1. In a lamp, the combination with the lamp body, of a reflector mounted therein, a plurality of supports for said reflector permitting adjustment of the reflector horizontally to locate it in normal fixed position relatively to the body, other supporting means permitting setting of the reflector angularly with respect to the other adjustment, and means associated with one of the supporting means but independent thereof in operation to obtain a tilting movement of the reflector.

2. In a lamp, the combination with the lamp body, of a reflector therein, two horizontally separated horizontal trunnions for the reflector having means to adjust the reflector to correct focal location for normal position, and a third support for the reflector having means of fixed adjustment therefor, and means associated with said last support for tilting the reflector from normal adjusted position.

3. In a lamp, the combination with a lamp body, of a reflector therein, two horizontally separated relatively adjustable supports for the reflector, means to fix said supports to hold the reflector in normal correct focal position, a third adjustable support therefor, a spring to retain the reflector against said support, and electrical means for tilting the reflector.

4. In a lamp, the combination with a lamp body, of a reflector therein, two horizontally separated relatively adjustable supports for the reflector, a third adjustable support therefor, a spring to retain the reflector against said third support, and a solenoid within the lamp for tilting the reflector.

5. In a lamp, the combination with a lamp body, of a reflector therein, a pivotal connection between said reflector and said body, a second pivotal connection between said reflector and said body, said last named connection being movable to adjust the reflector about the first connection, and means for tilting said reflector on both of said connections.

6. In a lamp, the combination with a lamp body, of a reflector therein, a socket at one side of and secured to the lamp body, a universal pivot carried by the reflector and resting in said socket, and two separated adjustable supports for the reflector.

7. In a lamp, the combination with a lamp body, of a reflector therein, a socket at one side of the lamp body, a universal pivot on the reflector resting in said socket, and two separated threaded devices adapted to adjust the reflector both horizontally and vertically.

8. In a lamp, the combination of a lamp body, of a solenoid therein, a member movable under the attractive force of the solenoid and having an opening therein, reflector supporting sockets in the sides of the lamp body, a reflector having parts supported in said sockets and having a portion extending outwardly therefrom, and resilient means for retaining the outwardly extending portion of said reflector in the opening of the solenoid controlled member.

9. In a lamp, the combination with a lamp body, of a solenoid therein, a member movable by the attractive force of the solenoid and provided with a transverse opening, reflector supporting sockets in the sides of the lamp body above said solenoid and open towards the front, and a reflector having a bracket adapted to fit in said opening and trunnion pieces adapted to fit in said sockets as the reflector is inserted in the lamp body.

10. In a lamp, the combination with a lamp body, of a solenoid therein, a member movable under the attractive force of the solenoid and provided with a transverse opening, reflector supporting sockets in the sides of the lamp body above said solenoid and open towards the front, a reflector having parts adapted to fit in said opening and said sockets as the reflector is inserted in the lamp body, and a spring for retaining the reflector in place in the sockets.

In testimony whereof I affix my signature.

ORMOND E. HUNT.